P. E. HOLT.
TRACTION BELT AND SUPPORTING ROLLERS.
APPLICATION FILED JULY 1, 1909.
986,391.
Patented Mar. 7, 1911.
3 SHEETS—SHEET 1.
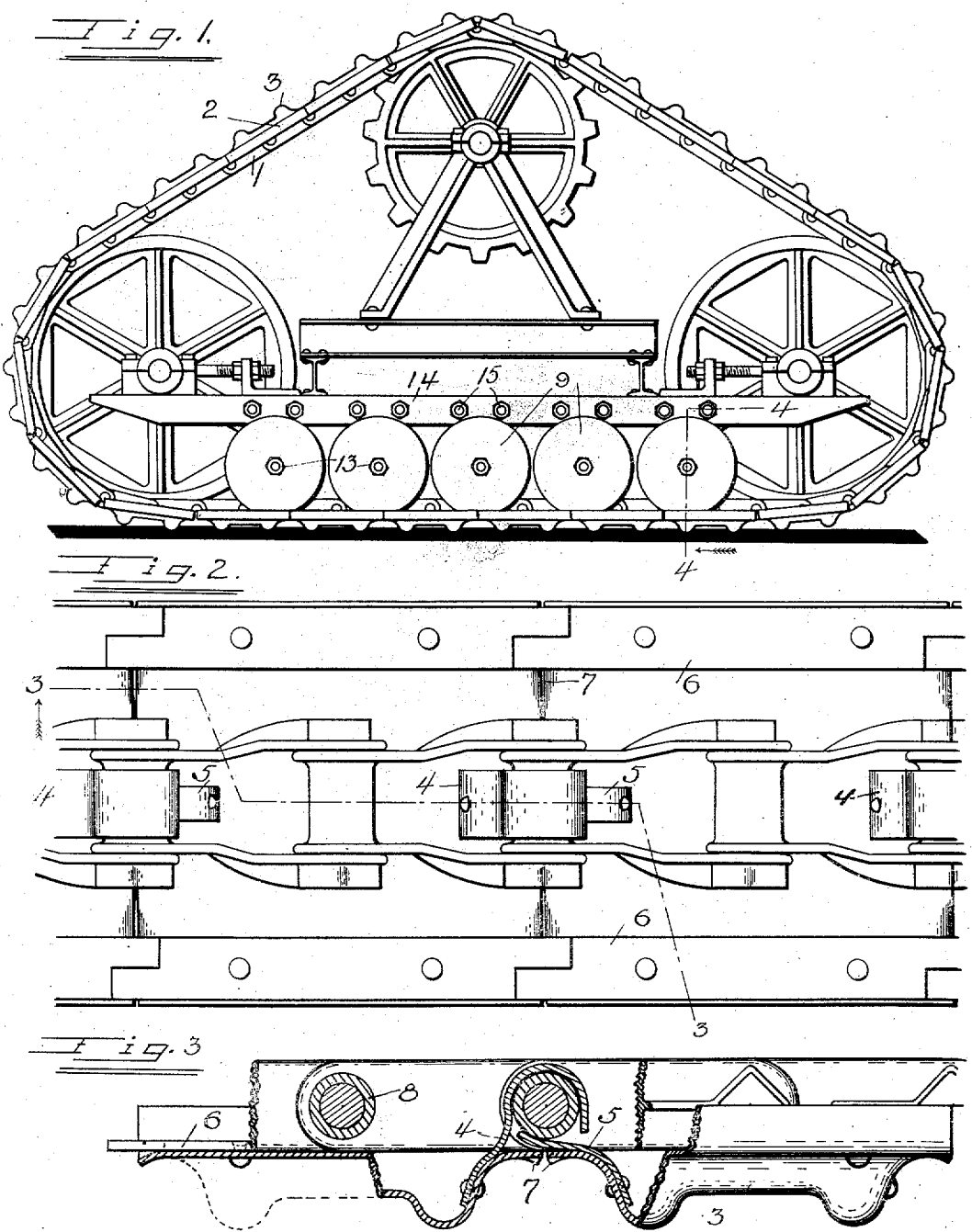

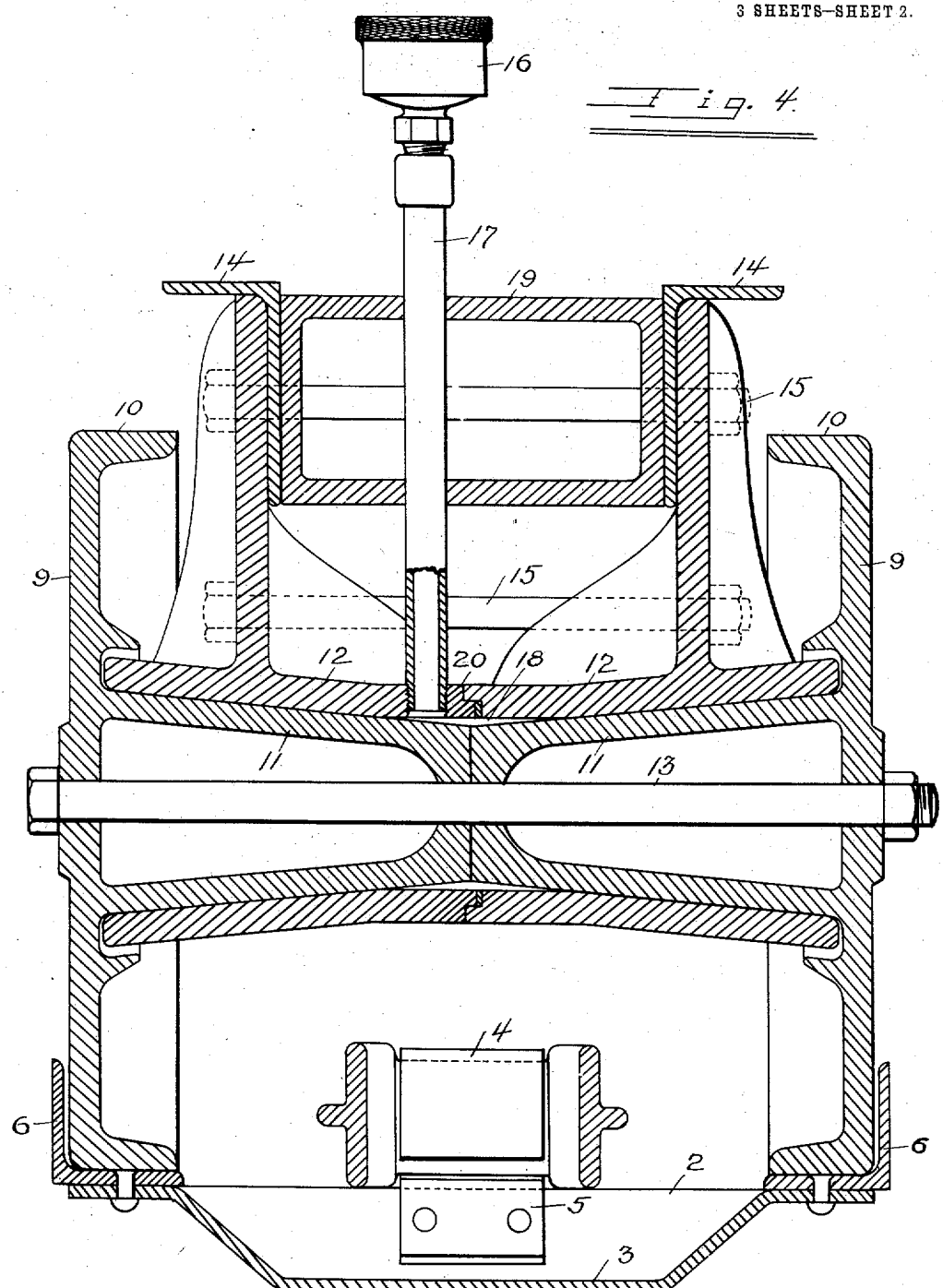

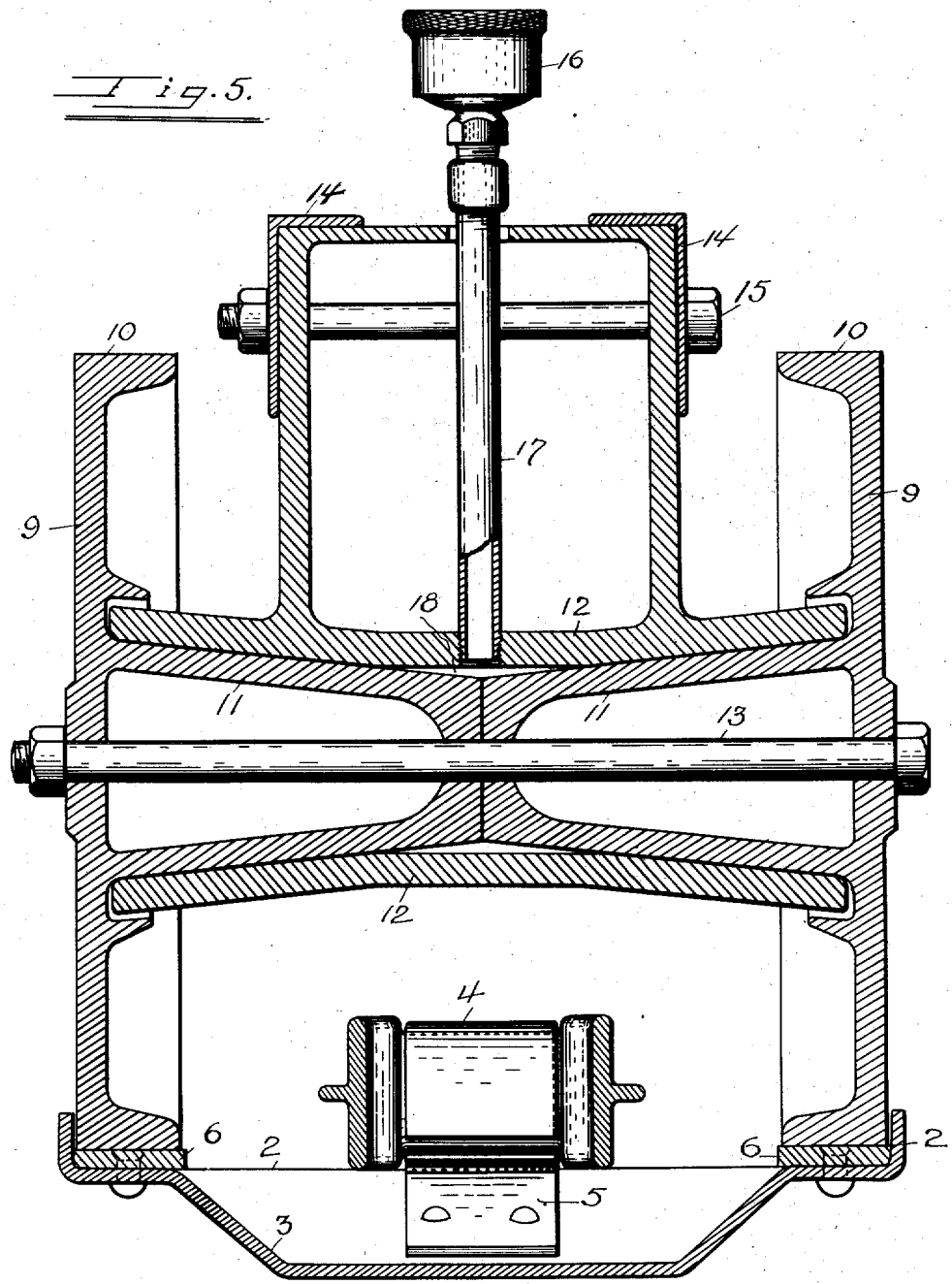

UNITED STATES PATENT OFFICE.

PLINY E. HOLT, OF STOCKTON, CALIFORNIA.

TRACTION-BELT AND SUPPORTING-ROLLERS.

986,391.      Specification of Letters Patent.      Patented Mar. 7, 1911.

Application filed July 1, 1909. Serial No. 505,384.

*To all whom it may concern:*

Be it known that I, PLINY E. HOLT, a citizen of the United States, and residing at 836 West Poplar street, in the city of Stockton, county of San Joaquin, and State of California, have invented certain new and useful Improvements in Traction-Belts and Supporting-Rollers; and I do hereby declare the following to be a full, clear, and exact description of the said invention, such as will enable others skilled in the art to which it most nearly appertains to make, use, and practice the same.

This invention relates to improvements in the endless belt type of traction mechanisms, and more particularly to the traction belt and supporting rollers, and consists in the novel construction and arrangement of the parts as hereinafter described.

The object of the invention is to provide a traction belt having a central draft chain to each side of which are suitably affixed tracks adapted to support the weight of the tractor, and a series of separable supporting rollers attached to the tractor frame and adapted to roll upon the said tracks. Heretofore it has been the practice to provide the central draft chain with side link plates capable of sustaining the weight of the tractor by interposing roller trucks between the draft chain and the tractor frame. This practice is objectionable because by placing the whole sustained weight on the center of the traction section it thereby causes undue torsional strain on the draft chain in passing over rough roads, in turning, and in working on side hills. Further it is impracticable to produce a chain capable of withstanding the twisting and crushing strains of supporting the weight of the tractor in addition to the pulling strains of progression for which it is primarily intended.

Broadly, the invention consists of a sprocket chain having traction sections of suitable width attached thereto to form a continuous jointed traction surface; interlapped track sections fixed to the lateral edges of the traction sections; and supporting rollers adapted to travel on said track sections.

In the drawings:—Figure 1 is a side elevation illustrating a complete traction mechanism comprising a driving sprocket, a supporting truck, idle sprockets in the ends thereof, a traction belt, and supporting rollers constructed in accordance with this invention. Fig. 2 is a detail plan view from above the traction belt. Fig. 3 is a detail cross section in side elevation of the same, taken on the line 3—3, Fig. 2. Fig. 4 is a detail vertical cross section of the rollers and journal mounting, taken on the line 4—4, Fig. 1, showing separable journal boxes. Fig. 5 is a similar view of an alternative construction, showing a simplified construction of the journal mounting.

In detail, the construction consists of the traction belt comprising the draft sprocket chain 1, of the conventional type. The traction sections 2, having the transverse grousers 3, struck down from the body thereof, and attached to the draft chain by the lips 4, riveted to the traction sections and encircling the alternative cross links of the draft chain. The opposite side of the traction section is attached by the clips 5, riveted thereto and interposed between the cross links and the adjacent edge of the preceding traction section. The method of attachment will vary to meet the variation in the type of draft chain used. The outer edges of the traction sections are provided with the track sections 6, fixed thereon and having their ends stepped into each other to overlap the gap between the traction sections in such a manner as to form a continuous bearing surface for the supporting rollers, and at the same time be capable of passing around the sprockets. To clear the overhanging ends of the tracks the corners of the traction sections are bent away, as at 7, to allow the necessary play in passing around the sprockets. To permit the use of the cheap malleable cast iron sprocket chain, the clips 4 are composed of hardened steel to receive the wear of the driving sprocket, and the alternate links are provided with the hardened steel sleeves 8, for the same purpose. This form of chain is desirable as it is amply strong for the single function of draft, as its first cost is low and its maintenance is nominal.

The supporting rollers comprise a pair of rollers 9, having the treads 10, and the tapered spindles 11. These rollers are journaled in the separable boxes 12, which are held together by the transverse bolts 15, which serve to clamp the boxes to the side beams, 14, of the supporting trucks and the interposed spacing blocks 19. The rollers are held in the tapered boxes by the bolt 13, passing through the rollers. Grease is fed to the journals by the compression cup 16, screwed into the pipe 17, screwed into the boxes and discharging into the chamber 18, which distributes to the spindles of both rollers. The particular advantage of constructing the rollers and their boxes in this manner is that one or more rollers may be removed or replaced without disturbing the traction belt or the other rollers in the series. By removing the bolt 15, the boxes may be separated at the joint 20, and by removing the bolt 13, the roller may be separated and taken out without disturbing the traction belt or the other rollers in the series. This separability in the rollers and boxes permits the "chilling" of the wearing surfaces of each in casting and results in a very durable structure. The journal boxes may, if desired, be cast in one piece—the construction depicted in Fig. 5.

This application is drawn particularly with reference to the construction and arrangement of a traction belt and supporting rollers which may be used with any of the general forms of traction belt tractors, a detailed description of which is deemed superfluous.

Having thus described this invention what is claimed and desired to secure by Letters Patent is:—

1. A traction mechanism consisting of a draft chain, a series of traction sections having one end secured to said chain by a clip fixed to the traction section and encircling the cross link of the chain, and having the opposite end attached by a clip fixed thereon and interposed between the edge of the adjacent traction section and the cross link to which it is attached, interlapped track sections fixed to the lateral edges of the traction sections, and separable rollers journaled in separable boxes and adapted to roll on said track sections.

2. A traction mechanism consisting of a draft chain, a series of traction sections secured to said chain, interlapped rail sections having an upturned flange and fixed to the lateral edges of the traction sections, and separable rollers journaled in separable boxes and adapted to roll upon said rail sections.

3. A traction mechanism consisting of a draft chain, a series of traction sections, clips for securing said sections to said chain, interlapped and flanged rail sections fixed to the lateral edges of the traction sections, and separable rollers adapted to roll upon said rail sections.

4. A traction mechanism consisting of a draft chain, a series of traction sections, clips for securing said sections to said chain, and separable rollers adapted to roll upon the lateral edges of said traction sections.

5. A traction mechanism consisting of a draft chain, a series of traction sections, clips for securing said sections to said chain, interlapped rail sections fixed to the lateral edges of the traction sections, and separable rollers adapted to roll on said rails.

6. A traction mechanism consisting of a traction belt, separable rollers adapted to roll upon the lateral edges of said traction belt and having tapered spindles assembled with their smaller ends abutting within separable journals.

7. A traction mechanism consisting of a draft chain, a series of traction sections having one end secured to said chain by a clip fixed to the traction section and encircling the cross links of the chain, and having the opposite end attached by a clip fixed thereon and interposed between the edge of the adjacent traction section and the cross links to which it is attached.

8. A traction mechanism consisting of a draft chain, a series of traction sections each having one end secured to said chain by a clip engaging the cross link of the chain the opposite end of said section being attached to a second clip interposed between the edge of the adjacent traction section and the cross link to which it is attached.

9. A traction mechanism consisting of a draft chain, a series of traction sections each having one end secured to said chain by a clip engaging the cross link of the chain, the opposite end of said section being attached to a second clip interposed between the edge of the adjacent traction section and the cross link to which it is attached, interlapped track sections fixed to the lateral edges of the traction sections, and separable rolls journaled in separable boxes and adapted to roll on said track sections.

10. A traction mechanism comprising a draft chain provided with track sections, side beams, separable journal boxes mounted in said beams, and separable rollers mounted in said boxes and having tread portions to engage said track sections.

11. A traction mechanism comprising a draft chain provided with track sections, side beams, separable journal boxes mounted in said beams, and separable rollers provided with tapered spindles mounted in said boxes, said rollers engaging said track sections.

12. A traction mechanism comprising a draft chain provided with track sections, side beams, separable journal boxes mounted in said beams, and separable rollers provided with abutting spindles mounted in said boxes, said rollers engaging said track sections, and securing bolts passed through each pair of abutting spindles.

In testimony whereof, I have hereunto set my hand.

PLINY E. HOLT.

Witnesses:
 JESSE VAN VALKENBURG,
 PERCY S. SAUNDERS.